United States Patent [19]

Miyazaki et al.

[11] Patent Number: 5,026,319
[45] Date of Patent: Jun. 25, 1991

[54] FISH PROCESSING MACHINE

[75] Inventors: Masatoshi Miyazaki, Yokohama; Ken Sasaki, Higashiyamato; Hachiro Maeda, Tama; Hisami Sakai, Kasukabe; Sumio Kamikawa, Hachioji; Kiyoshi Takai, Tama; Yutaka Ogawa, Ibaraki; Yuichi Tanaka, Toyonaka, all of Japan

[73] Assignees: Nippon Suisan Kaisha, Ltd., Tokyo; Nippon Fillestar Co., Ltd., Osaka, both of Japan

[21] Appl. No.: 596,390

[22] Filed: Oct. 15, 1990

Related U.S. Application Data

[62] Division of Ser. No. 406,968, Sep. 13, 1989.

[30] Foreign Application Priority Data

Feb. 25, 1989 [JP] Japan .................................. 1-44870

[51] Int. Cl.$^5$ ........................ A22C 25/12; B65G 47/24
[52] U.S. Cl. .................................. 452/177; 452/182; 452/179
[58] Field of Search ............... 452/177, 179, 182, 183, 452/161

[56] References Cited

U.S. PATENT DOCUMENTS

| | | | |
|---|---|---|---|
| 1,649,304 | 11/1927 | Gray | 452/179 |
| 3,348,260 | 10/1967 | Bartels et al. | 452/179 |
| 3,550,192 | 12/1970 | Ericksson | 452/179 |
| 4,399,588 | 8/1983 | Molnar | 452/179 |
| 4,557,020 | 12/1985 | Wenzel | 452/179 |
| 4,571,778 | 2/1986 | Sawusch et al. | 452/179 |
| 4,630,334 | 12/1986 | Evers et al. | 452/179 |

Primary Examiner—Willis Little
Attorney, Agent, or Firm—Wenderoth, Lind & Ponack

[57] ABSTRACT

A fish processing machine includes a fish body feeder, a decapitator, a belly filleting and viscera removing device, and a dark-colored flesh removing device. The fish body feeder is designed to transport fish bodies onto trays while aligning all of the fish bodies in a uniform direction. The dark-colored flesh removing device separates the ordinary flesh and dark-colored flesh of the fish body efficiently.

6 Claims, 14 Drawing Sheets

FISH PROCESSING MACHINE

FIELD OF THE INVENTION

1. BACKGROUND OF THE INVENTION

The present invention relates to a fish processing machine. Generally a fish processing machine includes a fish feeder, a decapitator, a belly filleting and viscera removing device, and a dark-colored flesh removing device. The present invention particularly relates to the feeder and to the dark-colored flesh removing device. The feeder conveys the fish in a flat position onto trays disposed at specific intervals with the bellies of all of the fish uniformly aligned in the same direction. The dark-colored flesh removing device separates the fish into ordinary flesh and dark-colored flesh and dark-colored flesh and removes the dark-colored flesh.

2. DESCRIPTION OF THE PRIOR ART

Of the devices composing a fish processing machine, the decapitator and the belly filleting and viscera removing device are same as known devices.

To begin with, a prior art feeder is described.

In processing a massive quantity of fish for the purpose of row collection or the like, the fish to be processed must be securely put on trays mounted on a chain or the like at specific intervals one-by-one, and the fish body must be arranged in a specific back-belly direction, i.e. with the belly oriented in a particular direction, for the convenience of subsequent processes such as decapitation, filleting and removal of viscera. In order to perform these two jobs simultaneously, hitherto manual labor was employed.

Next is explained a prior art dark-colored flesh removing device.

In the case of so-called red flesh fish such as sardine, mackerel and saury pike, as shown in FIG. 16 and FIG. 17, there is an oily layer called sebum at the inner side of the epidermis of the fish body F1, and further inside of the oily layer there is a so-called dark-colored flesh indicated by reference numeral 102. This dark-colored flesh 102 is easier to row than ordinary flesh 103, and does not taste good. Therefore, when making flesh paste, such as for fish cakes, from the fish body F1, a mixture of the dark-colored flesh 102 into the ordinary flesh 103 results in a reddish change of color of the ordinary flesh 103, which spoils the quality of the fish paste product. Therefore, such dark-colored flesh 102 is conventionally removed. Meanwhile, in the case of white flesh fish such as cod, the dark-colored flesh is not so significant, but most be removed just the same.

In the area of joining of the dark-colored flesh 102 and the ordinary flesh 103 which occupies the majority of the fish body F1, there is a thin layer of a different texture than other portions, and the dark-colored flesh 102 and the ordinary flesh 103 easily can be separated from each other.

FIG. 18 is a sectional view of a conventional dark-colored flesh removing device 105. In the dark-colored flesh removing device 105, a pair of pressure members 106, 107 formed in a roller shape are disposed in peripheral opposition to each other, and recesses 108, 109 are formed on the entire outer circumferences of the pressure members 106, 107, respectively. The pressure members 106, 107 are rotated and driven mutually in reverse directions around the rotary axes of rotary shafts 113, 114 by means of gears 110, 111, 112.

A fish body from which the head and tail are chopped off is guided in to a gap 115 formed approximately in an elliptical shape by the recesses 108, 109 by means of a guide member (not shown), and is pinched and pressed by the rotation of the pressure members 106, 107. Therefore, as shown in FIG. 19, the ordinary flesh 103 of the fish body F1 is pushed out toward the outside.

In such prior art device, since the surface of the fish body is slippery, the fish body may be deviated sideways when being pinched between the pressure members 106, 107, and it cannot be placed exactly in the desired position in the gap 115. When the fish body is pressed in such deviated state, the dark-colored flesh 102 may be mixed into the ordinary flesh 103. Besides, since the size of all fish bodies is not uniform, the fish bodies must be selected depending on the size of the gap 115.

Also, in the prior art, the fish body supplied into the dark-colored flesh removing device is opened only at the belly side, and in order to push out the ordinary flesh efficiently from both the belly side and the dorsal side, it is necessary to substantially increase the pushing force of the pressure members 106, 107 into the fish body F1. In such a case, when the fish body F1 is pressed by the pressure members 106, 107, an excessive force acts on the dark-colored flesh 102 and the backbone 116, and the dark-colored flesh 102 and the backbone 116 may be pushed outward together with the ordinary flesh 103. It is therefore necessary to adjust the pressing force of the pressure members 106, 107 acting on the fish body F1. However, adjustment of the pressing force of the pressure members 106, 107 requires a complicated structure, and the apparatus is increased in size.

SUMMARY OF THE INVENTION

The feeder of the invention first will be discussed.

According to the prior art arrangement mentioned above, too much time and labor are required for laying and arranging the fish bodies uniformly.

It is hence a primary object of the invention to provide a fish body feeder simple in structure, low in manufacturing cost, and with fewer troubles by solving the above-discussed problems.

The fish body feeder of the invention comprises:

a conveying trough for conveying fish bodies one-by-one in a determined head-tail alignment, first constant feed means disposed above the conveying trough in a manner to freely move toward and away from the conveying trough, and possessing a first rotary feed member which is driven to convey the fish body on the trough from an upstream side to a downstream side, a feed trough inclined downwardly in the fish body conveying direction, possessing a concave fish body conveying surface, and having a notch near the downstream end thereof in the conveying direction, a receiving trough disposed beneath the notch, back-belly aligning means having a fish body tilting mechanism disposed on a discharge trough disposed at the downstream end of the receiving trough, second constant feed means possessing a second rotary feed member for discharging the fish bodies on the discharge trough one-by-one intermittently, and transportation means having plural trays for holding the fish bodies one-by-one disposed at equal pitches on a moving body driven in the running direction orthogonal to the conveying direction.

In the invention, the first rotary feed member and the second rotary feed member may rotate at identical speeds.

The operation of this apparatus is explained below. The fish bodies supplied onto the conveying trough are constantly supplied one-by-one by the operation of the first rotary feed member, and are sent into the feed trough. From there, the fish bodies drop down onto the receiving trough, with the back sides facing downwardly, through the notch. The back-belly orientation of the fish bodies is aligned by the tilting mechanism, and the fish bodies are moved onto the discharge trough. From the discharge trough, by operation of the second rotary feed member, the fish bodies are discharged one-by-one onto the trays on the moving body in a specific sequence, and then are transported thereby.

The invention, by combining the first constant feed means, the back-belly aligning means and the second constant feed means with the transportation means, makes it possible to convey the fish bodies automatically, since the fish bodies are placed on the transportation means, one-by-one, with the proper back-belly alignment. What is more, the apparatus is simple in structure and low in cost, and is free of trouble, maintenance labor may be saved, and many other advantages are achieved.

The dark-colored flesh removing device of the invention will next be discussed. It is another purpose of the invention to provide a dark-colored flesh removing device capable of securely removing the dark-colored flesh and obtaining flesh enhanced in quality, by solving the above technical problems, by securely holding and pressing the fish bodies, regardless of size, without allowing the fish bodies to be deviated sideways or to escape, and by pressing the fish bodies with a proper pressing force so as not to crush the dark-colored flesh and the backbone, without complicating the structure.

The dark-colored flesh removing device of the invention for filleting the belly of a fish body in the longitudinal direction, conveying the fish body in a decapitated state, and removing the dark-colored flesh of the fish body comprises:

a pair of endless conveying chains disposed above and below in the vertical direction for conveying the fish bodies in the longitudinal direction, holding members disposed parallel to the chains, of which a lower side holding member is disposed on the lower side conveying chain along the conveying route and possesses a concave fish body holding surface and an upper side holding member is disposed in the upper side conveying chain along the conveying route, is made of elastic and flexible material, and is mounted on a support member, a pressing member for thrusting and pressing the confronting holding surfaces of the upper side and lower side holding members in mutually approaching directions, and means for filleting the dorsal side of the fish body and disposed at the upstream end of the conveying route from the pressing member.

In the invention, a space is provided between the upper side holding member and support member disposed on the upper side conveying chain.

Also in the invention, the space between the upper side holding member and support member disposed on the upper side conveying chain may be filled with a flexible material.

According to the invention, when the fish body with the belly thereof filleted in the longitudinal direction and decapitated is supplied at the start end of the conveying chain, it is held between the holding surfaces of the upper side and lower side holding members. The fish body is, at this time, held between the elastic and flexible holding member at the upper side and the concave holding member disposed at the lower side, so that the fish body is held securely without sliding sideways regardless of the size of the fish body. The fish body thus held between the holding surfaces is conveyed along the conveying route by the conveying chains. In the midst of such conveying, the back of the fish body is filleted by cutting means, and the confronting holding surfaces of the holding members are pressed toward each other by the pressing members. At this time, since the holding members are made of elastic and flexible material, the fish body can be pressed to such an extent that the backbone or flesh will not be crushed, and the holding surfaces are deformed in such a manner as to avoid crushing the backbone and dark-colored flesh, so that the dark-colored flesh remains between the holding surfaces tightly in contact with the backbone. In this manner, without requiring complicated structure and without increasing the size of the apparatus, the ordinary flesh can be securely removed from the dark-colored flesh, and the fish can be separated into ordinary flesh and dark-colored flesh regardless of the shape or size of the fish body.

Thus, according to the invention, since the holding surface of the holding member disposed on the lower side conveying chain is formed in a concave shape, the held fish body is partly entrapped in the concave holding surface on the lower side by the elastic and flexible holding member disposed on the upper side conveying chain, and dislocation of the fish body in the lateral directions of its conveying route is prevented, so that the fish body can be securely held and conveyed. Therefore, regardless of the size of the fish body, lateral dislocation of the fish body may be prevented, and the dark-colored flesh may be removed at an advanced yield. Also, because of the back cutting means, the ordinary flesh can be pushed to the outside sufficiently with a small pressing force. Furthermore, since a chain is used as the means for conveying the fish body, the fish body may be conveyed smoothly while removing the dark-colored flesh without causing jerky motion. As a result, flesh of improved quality will be obtained.

Moreover, according to the invention, since at least one of the holding members is made of an elastic and flexible material, when pressed by the pressing member in a held state, it is elastically deformed depending on the fish size so as to avoid relatively hard portions such as the backbone of the fish body. Thus, the portion of the dark-colored flesh and skin sticking to the backbone and the ordinary flesh can be separated without crushing the backbone, and the ordinary flesh easily can be pushed out. Hence, without complicating the structure and increasing the size of the apparatus, the dark-colored flesh can be securely removed regardless of the size of the fish body, and an ordinary flesh free from dark-colored flesh can be obtained.

DETAILED DESCRIPTION OF THE PREFERRED EMBODIMENTS

Figure 1:
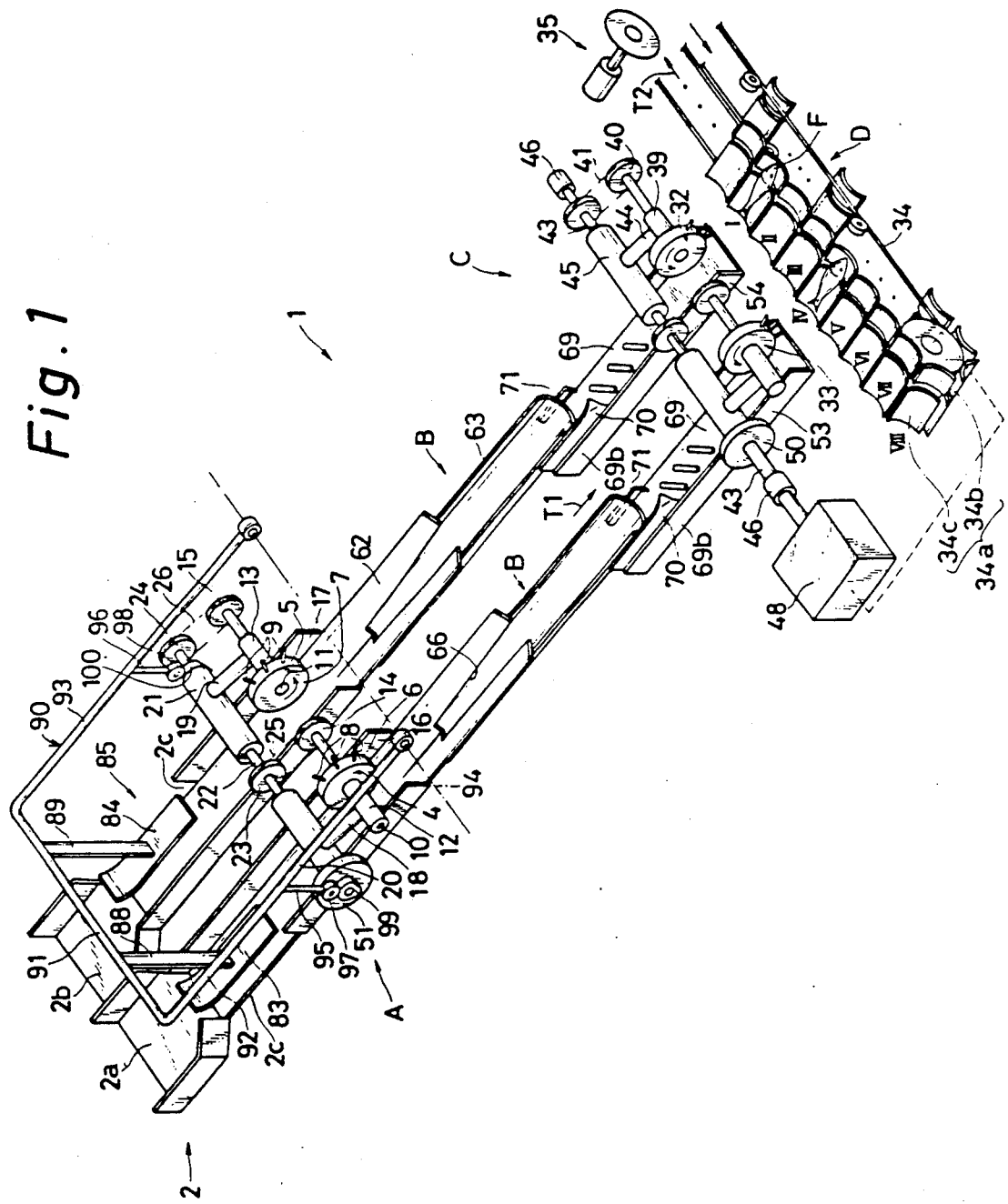
FIG. 1 is a simplified perspective view of an embodiment of the invention.

Referring now to the drawings, some embodiments of a fish body feeder of the invention are described in detail below.

As shown in FIG. 1, the invention is composed by roughly combining first constant feed means A for feeding fish bodies at specific intervals one-by-one, back-belly aligning means B for angularly dislocating a fish body F around the body and aligning all fish bodies uniformly with bellies thereof in the same direction, second constant feed means C for mounting the fish bodies F intermittently on trays 34a, and transportation means D for receiving and transporting the fish bodies F in cooperation with the second constant feed means C.

The first constant feed means A descends and inclines in the downstream direction so as to feed the fish bodies F in a longitudinal direction one-by-one, and possesses, for example, two rows of parallel conveying troughs 16, 17, and first rotary feed members 4, 5 disposed above the conveying troughs 16, 17 in a manner free to move toward and away from the troughs 16, 17 respectively. The first rotary feed members 4, 5 include rotors 6, 7 which are rotated and driven in the rotating direction for conveying the fish bodies F on the conveying troughs 16, 17 from an upstream side to a downstream side in a conveying direction T1 around the axial line of rotary shafts 10, 11 extending in the horizontal direction at a right angle to the conveying direction of the conveying troughs 16, 17. From the peripheral surfaces of these rotors 6, 7 project stopping pieces 8, 9. The rotary shafts 10, 11 are fixed with rotors 6, 7, are supported by bearings 12, 13, and sprocket wheels 14, 15 are fixed thereto.

Figure 4:
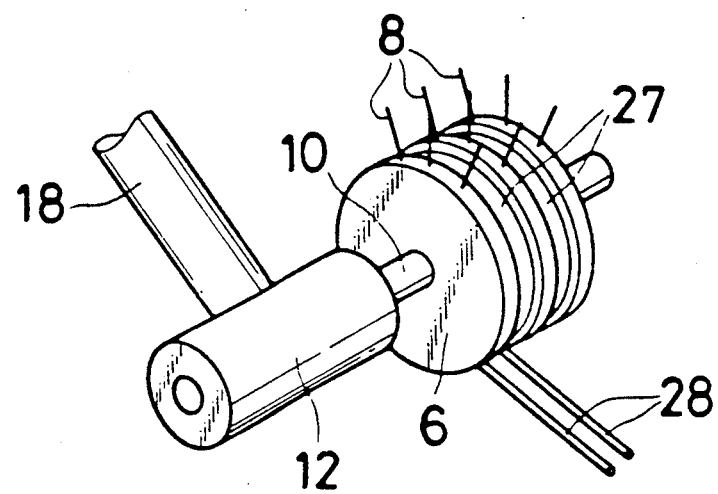
FIG. 4 is an enlarged perspective view of a rotor.

The bearings 12, 13 are fixed to bearings 20, 21 by arms 18, 19. The bearings 20, 21 support a horizontal rotary shaft 22 supported at a fixed position. On the rotary shaft 22 are fixed sprocket wheels 23, 24 that drive sprocket wheels 14, 15 through chains 25, 26. As shown in FIG. 4, two rows of grooves 27 are formed in rotor 6 along the periphery thereof, and holding pins 28 provided at fixing positions and having elasticity are fitted therein.

Figure 2:
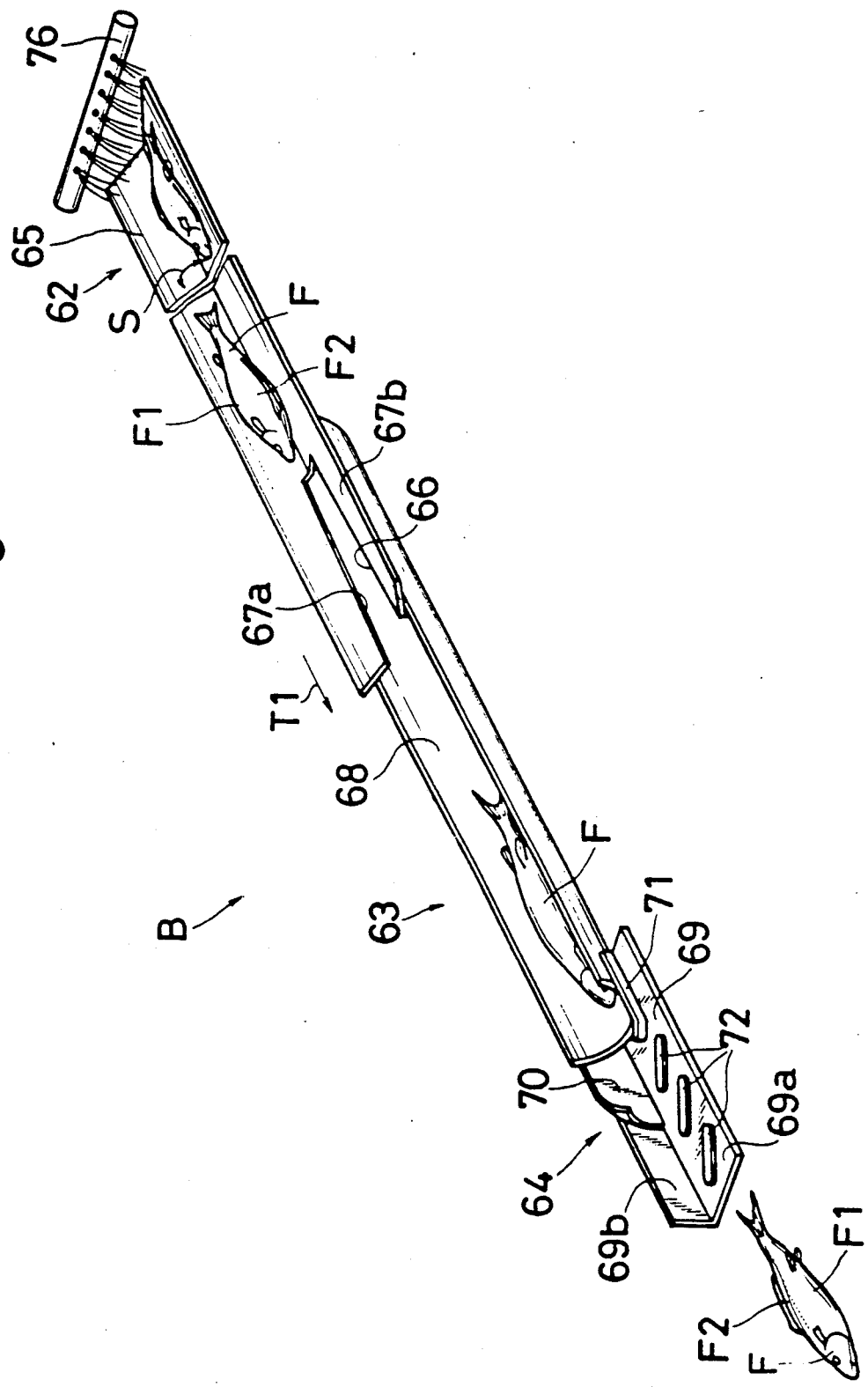
FIG. 2 is a perspective view of back-belly aligning means.

Next, the back-belly aligning means B is, as shown in FIG. 1 and FIG. 2, disposed at the downstream side of the first constant feed means A, and descends and inclines in the downstream direction so that the fish bodies will slide downwardly, and also includes feed troughs 62 disposed parallel to the conveying troughs 16, 17, receiving troughs 63 disposed beneath the downstream end portions of the feed troughs 62 and formed integrally with the feed troughs 62, and fish body tilting mechanisms 64 disposed near the downstream ends of the receiving troughs 63.

Each feed trough 62 comprises a fish body conveying surface 65 on which a fish body F dropped on the feed trough 62 is conveyed, and fish body conveying surface 65 is formed approximately in a concave V-shape at a predetermined angle S. At the downstream side end of the fish body conveying surface 65 is formed a notch 66 that is open toward the downstream side and that gradually widens toward the downstream side. The peripheral edge of this notch 66 is defined by guide surfaces 67a, 67b continuous with the conveying surface 65, and guide surfaces 67a, 67b are formed symmetrically to the axial line of the fish body conveying surface 65. At the upstream side of the feed trough 62 is disposed a nozzle 76 for injecting a specific flow rate of water into the feed trough 62 in order to allow the fish body F to slide down easily.

The receiving trough 63 forms, as described later, an approximately U-shaped receiving surface 68 for receiving the fish body F with the dorsal part F2 of the fish body F downward, and for feeding the thus oriented fish body onto the fish body tilting mechanism 64. The fish body tilting mechanism 64 comprises a guide plate 69 in an almost L-shape disposed at the end portion of the downstream side of the receiving trough 63, a fish body pressing plate 70 having one end fitted to the downstream side end portion of the receiving trough 63 and the other end curved inwardly, a hooking member 71 fitted to the downstream side end portion of the receiving trough 63 on the side thereof opposite to the fish body pressing plate 70, and plural guide protrusions 72 disposed on the bottom 69a of the guide plate 69 downstream of the fish body pressing plate 70 and hooking member 71. The guide protrusions 72 are parallel to each other, and are inclined in the downstream direction toward a side portion 69b of the guide plate 69.

Figure 6:
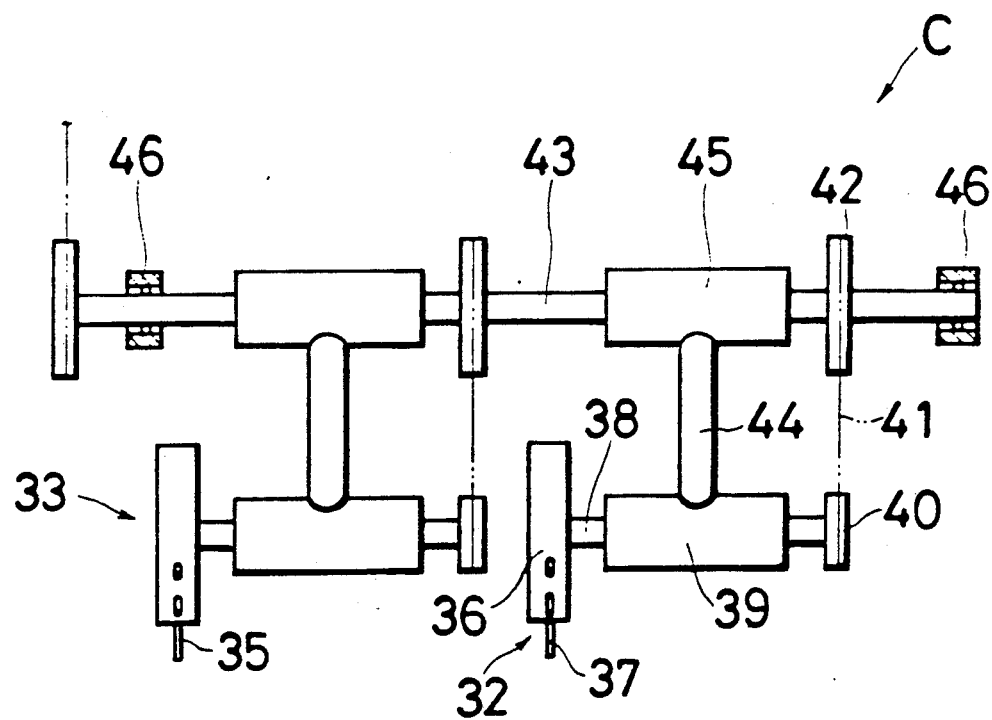
FIG. 6 is a plan view of a discharge member.

FIG. 6 is a plan view of the second constant feed means that includes two rows of send-out or discharge troughs 53, 54 connected to the downstream end of the back-belly aligning means B. On troughs 53, 54 are disposed in parallel two second constant feed members 33, 32 connected to the troughs 53, 54, respectively, with their center lines shifted toward the side portions 69b of the respective guide plates 69 (to the left in FIG. 1) from the center lines of the send-out troughs 53, 54 thus being adjusted to the fish bodies F discharged from the guide plates 69. The second constant feed member 32, as is obvious from FIG. 6, includes a stopping piece 37 partially in a pin shape projected from the peripheral surface of a rotor 36 fixed to rotary shaft 38.

The rotary shaft 38 is supported by a bearing 39 and is rotated and driven through a sprocket wheel 42, a chain 41 and a sprocket 40 by a rotary shaft 43 linked to a gear box 48 so as to delivered a rotating force from a drive source in two different rotating directions. A bearing 39 is fixed by an arm 44 to a bearing 45 which supports the rotary shaft 43, and thus is allowed to oscillate about the rotary shaft 43. The other second rotary feed member 33 is similarly composed, and the two second rotary feed members 32, 33 are in phase circumferentially with respect to the positions of stopping pieces 37, 35, and are rotated and driven at identical speeds. Also, both second rotary feed members 32, 33 are provided holding pins (not shown) similar to the holding pieces 28 of the first rotary feed members 4, 5.

The rotary shaft 43 is supported by bearings 46 disposed at fixed positions. The second rotary feed members 32, 33 and the first rotary feed members 4, 5 are rotated at identical speeds by sprocket 50, 41 fixed to the rotary shafts 43, 22 and an endless chain 52 (FIG. 3) running over such sprockets.

The transportation means D includes an endless chain 34 on which a plurality of trays 34a for mounting or receiving the fish bodies F one-by-one are installed at equal pitches, and chain 34 is driven in cooperation with the rotary shaft 43 by means of gear box 48.

The chain 34 is disposed at the downstream side of the second constant feed means C while being driven in a horizontal direction T2 orthogonal with the conveying direction T1 of the fish body F, and is designed to run in the horizontal direction at a right angle to the parallel discharge troughs 53, 54. As shown in FIG. 1, the interval between the centers of the troughs 53, 54 and the total length of three pitches of the trays 34a of the chain 34 are determined to be equal to each other. The traveling speed of the chain 34 is set so as to move by two pitches per each revolution of the second rotary feed members 32, 33.

Figure 3:
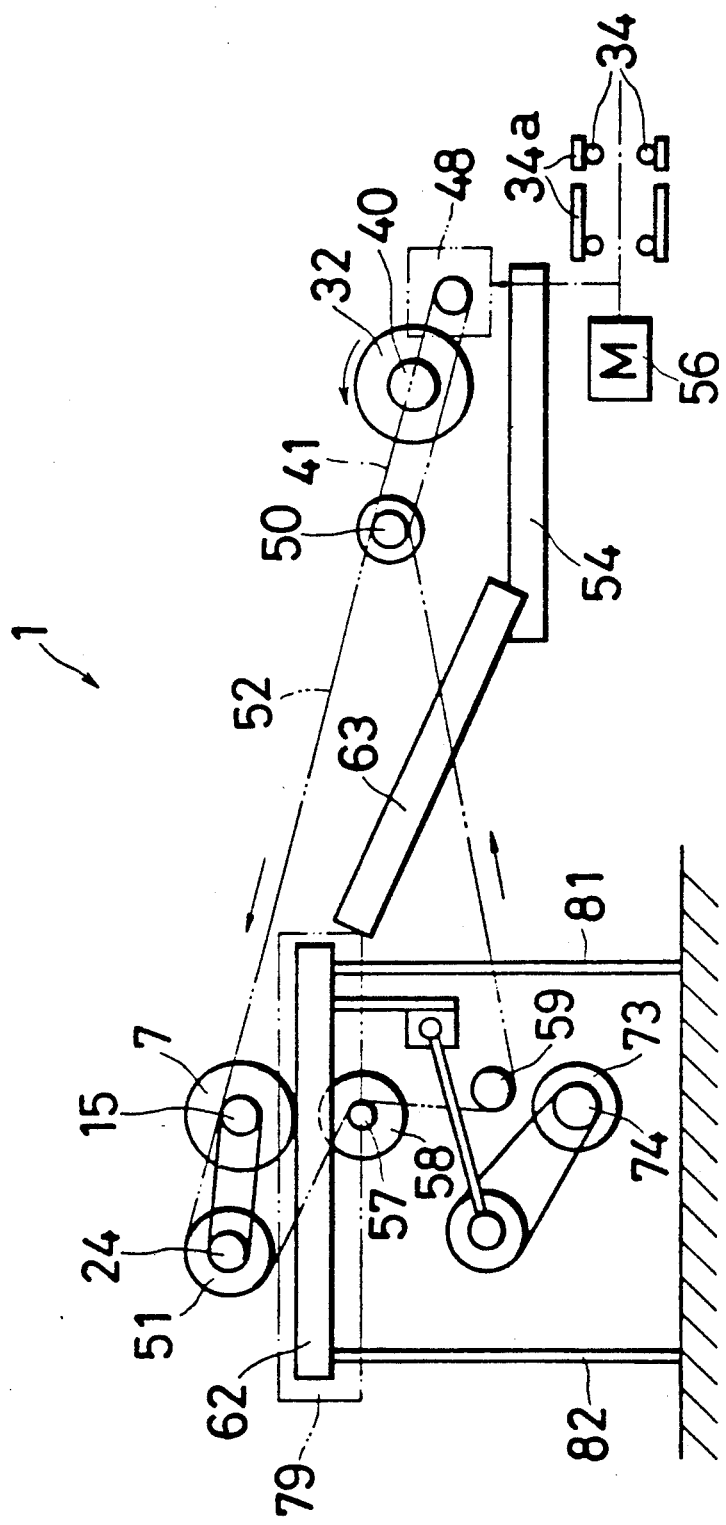
FIG. 3 a front view of a fish body feeder.

As shown in FIG. 3, the rotary force of a motor 56 is transmitted to the chain 34 to drive the fish body feeder 1. On the other hand, this rotary driving force is transmitted to the gear box 48, and the rotating direction is converted to 90 degrees to rotate the sprocket wheel 50. As a result, the second feed members 32, 33 are driven as mentioned above. On the other hand, the driving force of the sprocket wheel 50 drives the sprocket wheel 51 as well as a sprocket wheel 57 and an idle wheel 59 by the chain 52 as shown in the drawing.

On the sprocket wheel 57 is coaxially disposed a rotor 58, for example, of the same composition as the rotor 7, and rotors 7, 58 hold a fish body F to convey it securely.

Figure 5:
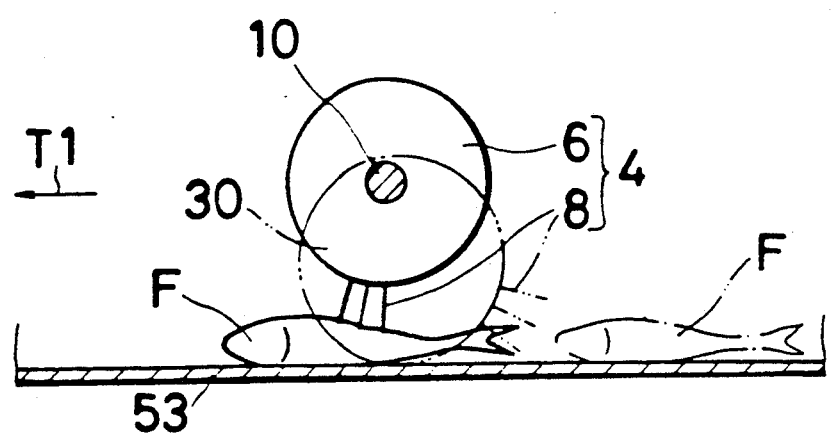
FIG. 5 is an explanatory diagram of a fish body conveying operation by a rotary feed member.

In this apparatus 1 the operation is as follows. A fish body F is sent into a guide means 2 with the head directed forwardly, and is transferred into the conveying troughs 16, 17 through troughs 2a and 2b of the guide means 2. When two or more fish are sent out simultaneously from, e.g., from the trough 2a, all but one drop off through the notch 2c. The fish bodies F sent into the conveying troughs 16, 17 one-by-one linearly slide downalong the sloped troughs and reach the first constant feed means A. Thereat each fish is skewered by the stopping pieces 8, 9 and by the rotation of the first rotary feed members 4, 5 as shown in FIG. 5, is conveyed downstream.

After such conveyance, the stopping pieces 8, 9 are retracted from the fish bodies F by the operation of the holding pins 28 holding the fish bodies down, and the fish bodies F are conveyed onto the conveying troughs 16, 17. The rotary feed member 4 is, as indicated by reference numeral 30 in FIG. 4, at a lowered position while not conveying a fish body, and is allowed to oscillate by the arm 18. The construction is the same for the other first rotary feed member 5.

Figure 7:
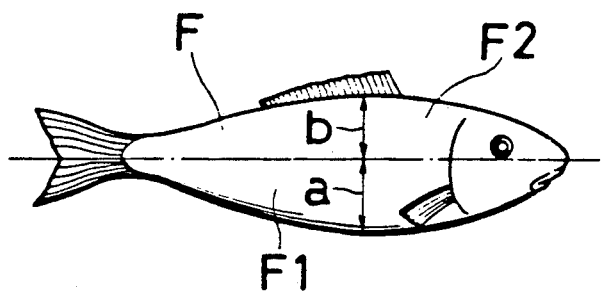
FIG. 7 is a simplified side view of a fish body.
Figure 8:
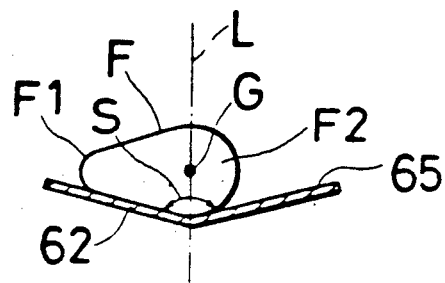
FIG. 8 is an explanatory front view showing the basic action of conversion of the position of the fish body.
Figure 9:
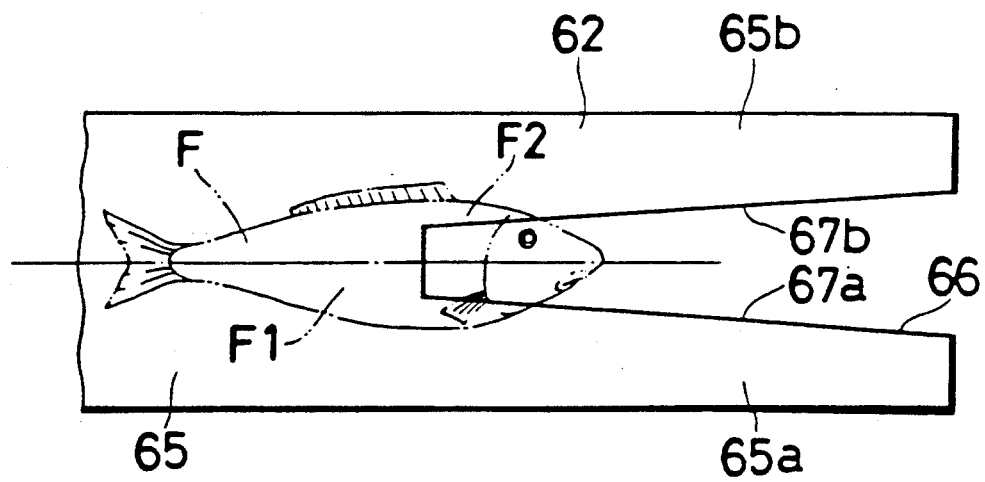
FIG. 9 is an explanatory plan view showing the basic action of conversion of the position of the fish body.
Figure 10:
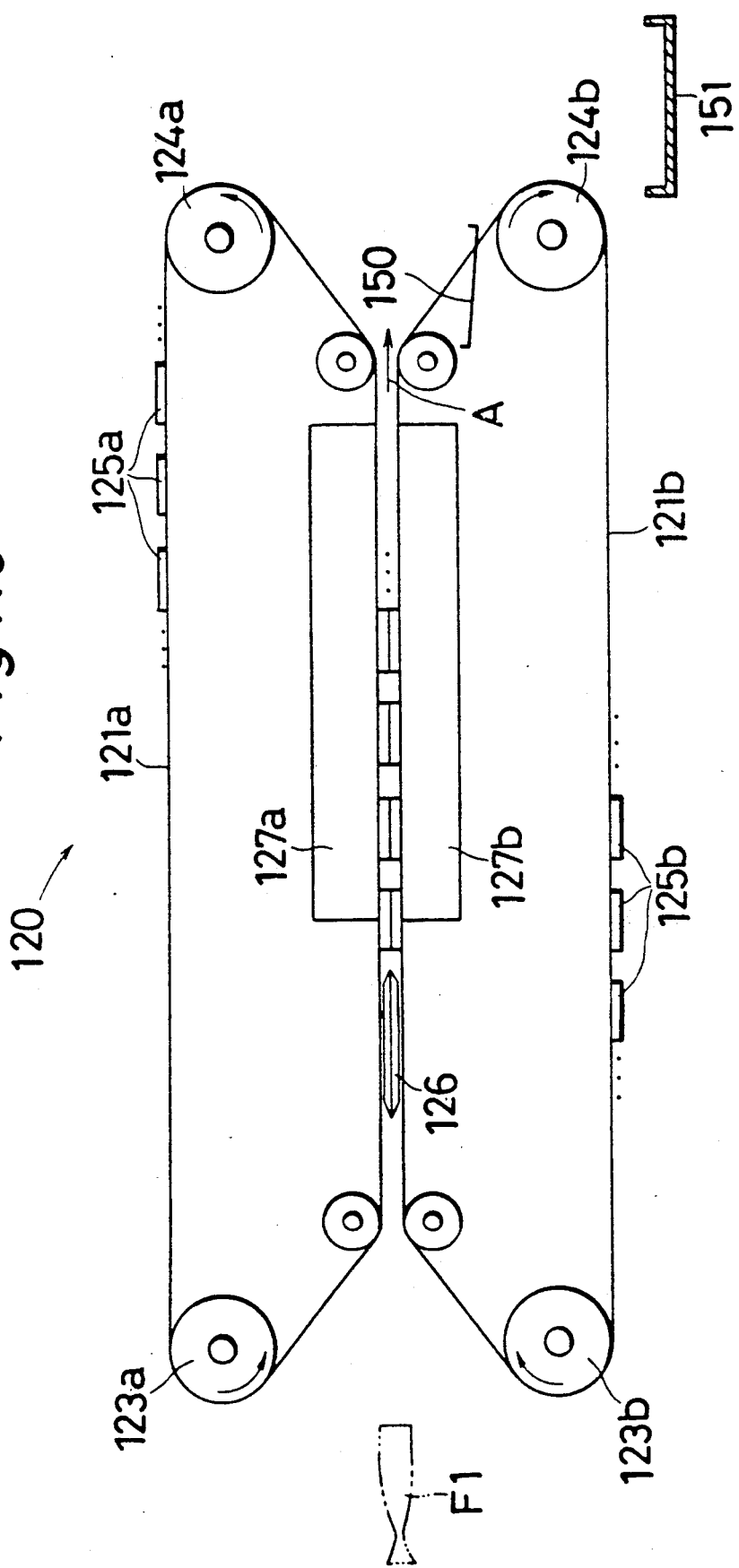
FIG. 10 is a side view of a dark-colored flesh removing device of an embodiment of the invention.

Consequently, at the back-belly aligning means B, as shown in the simplified side plan view of the fish body F (FIG. 7), the width a of the belly portion F1 of the fish body is greater than the width b of the dorsal portion F2. The fish body F flowing on the spray of water from the nozzle 76 of the feed trough 62 is, as shown in FIG. 8, conveyed in the downstream direction on the fish body conveying surface 65 while sliding sideways in a direction such that the center of gravity G (at the dorsal side F2) moves toward a center line L of the feed trough 62 forming a V-shape. When the fish body F reaches a position opposing the notch 66, as shown in FIG. 10, the dorsal part F2 is opposite on the notch 66, and the majority of the belly F1 is supported on one conveying surface 65a of the feed trough 62.

In such state, when the fish body F advances further over the notch 66, the dorsal part F2 move into the notch 66. When further moving forward to pass through the notch 66, the fish body is rotated about the body to a position such that the belly F1 faces upward and the back F faces downward, and it passes through the notch 66 in this state to fall into the receiving trough 63.

The fish body F supplied onto the receiving surfaces 68 of the receiving trough 63 is conveyed therefrom into the tilting mechanism 64 in a position with the back side F2 down. The fish body pressing plate 70 abuts against one side of the fish body F, and presses the upper portion (belly F1) of the fish body F with its inwardly curved part, while the hooking member 71 abuts against the lower portion of the other side, so that the lower end of the fish body F is set free. Thereby, the position of the fish body is converted so that the belly F1 is directed in the running direction T2 (the right side in FIG. 1) and that the back F2 confronts the lateral part 69b side of the guide plate 69. Furthermore, when the fish body F is put on the bottom 69a of the guide plate 69 and conveyed, the fish body F receives the action of the guide protrusions 72 and thereby is shifted toward lateral portion 69b, so as to be conveyed in a state allowing the back F2 to slide on the lateral portion 69b. The fish body F thus passing through the tilting mechanism 64 is aligned in a proper back-belly direction, with the belly F1 directed in the downstream running direction T2, and the back F2 directed in the upstream direction.

The fish body F is charged into the feed trough 62 head side first in the foregoing explanation, but when charged tail first, the position is always converted when falling from the notch 66 by the principle mentioned above so that the dorsal part F2 will be down and the belly F1 up, and when passing through the tilting mechanism 64, the back-belly direction is correctly aligned in the same manner as described above.

In the case of a nearly symmetrical fish (such as sardine and cod) wherein the width a of the belly F1 and width b of the back F2 are nearly equal, the water injection from the nozzle 76 may be increased so that fish body easily will slide sideways during conveyance along the conveying surface 65. Alternatively, the tilting angle of the feed trough 62 may be increased, or the V-angle S of the feed trough 62 may be narrowed, so that the same effects as stated above will be obtained.

In the second constant feed means C, the two rows of rotary feed members 32, 33 are located above the center of the fish body F being supplied in the troughs 53, 54 and operate in the same manner as the rotary feed members 4, 5 to skewer each fish body F1 by stopping pieces 37 once every rotation of members 32, 33 and to discharge the fish in the downstream direction to the transportation means D.

The transportation means D receives the fish bodies F2 one-by-one from the means C, in the trays 34a on the chain 34. Each tray includes a first tray portion 34b and a second tray portion 34c. The head is chopped off between the tray portions 34b, 34c by a cutting means 35.

Referring next to FIG. 10 to FIG. 19, an embodiment of the dark-colored flesh removing device of the invention is explained below.

FIG. 10 is a side view of the dark-colored flesh removing device 120 according to the embodiments of the invention. A pair of endless conveying chains 121a, 121b are stretched between sprocket wheels 123a, 123b at an upstream end and sprocket wheels 124a, 124b at a downstream end. Sprocket wheels 123a, 123b, 124a, 124b have mutually parallel horizontal trays axes. The sprocket wheels 123a, 123b are rotated and driven by a drive motor (not shown) about the respective rotary axes, so that the conveying chains 121a, 121b are driven nearby at identical speeds.

Plural holding members 125a, 125b for holding fish bodies F1 are disposed in parallel and closely to each other on conveying chains 121a, 121b, respectively. When a fish body F1 is supplied from the starting end, it is held between respective holding members 125a, 125b and is conveyed in a conveying direction A by means of conveying chains 121a, 121b.

The dark-colored flesh removing device 120 comprises a rotary cylinder knife 126 for filleting the dorsal part of the fish body F along the conveying route, and pressing members 127a, 127b for thrusting the holding members 125a, 125b on opposite sides along the conveying route of the fish body F1 in a mutually approaching direction. The rotary circular knife 126 has a rotary axis vertical to the conveying route, and the dorsal skin of the fish body F1 is cut open.

Figure 11:
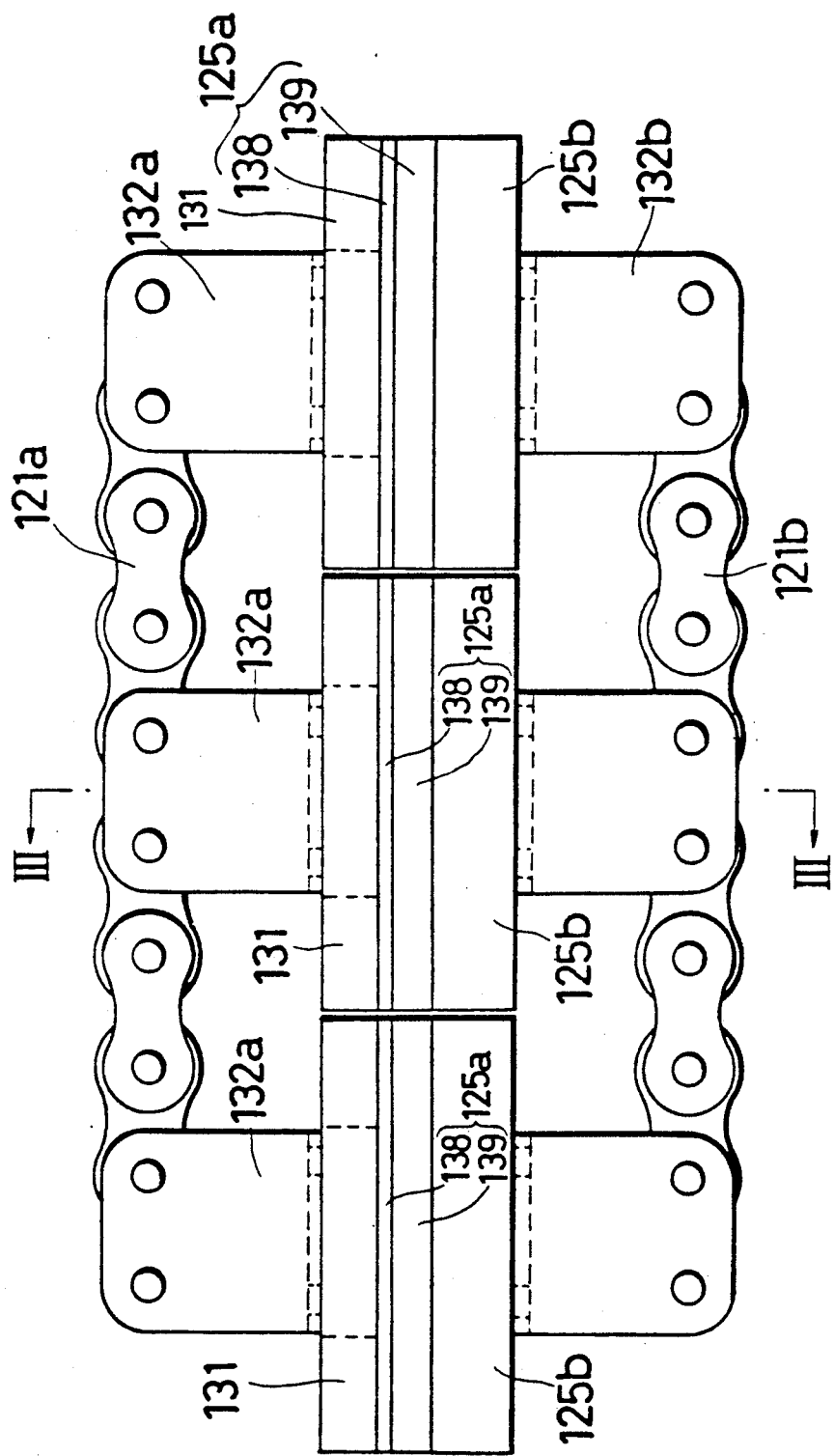
FIG. 11 is a side view of holding members.
Figure 12:
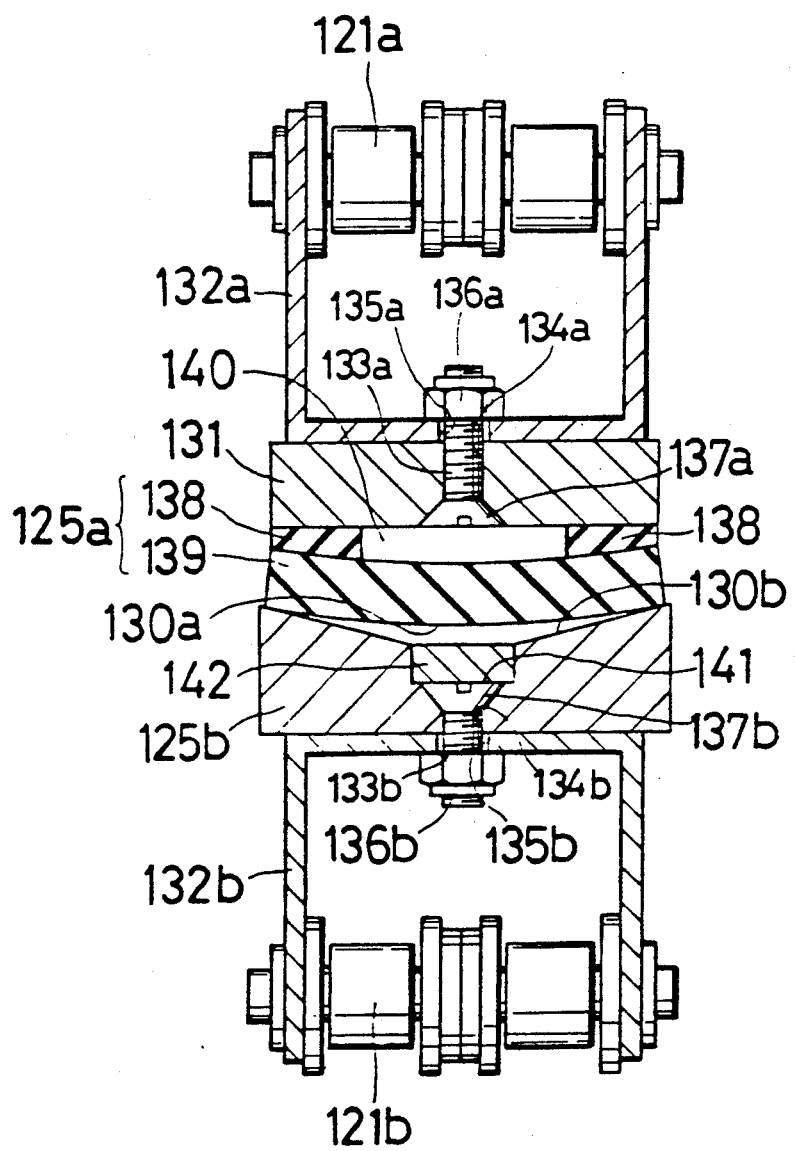
FIG. 12 is a sectional view along line XII—XII in FIG. 11, FIG. 13, FIG. 14 and FIG. 15 are sectional views showing the operation of the dark-colored flesh removing device.

FIG. 11 is a side elevation of the holding members 125a, 125b fitted to the conveying chains 121a, 121b, and FIG. 12 is a sectional view taken along line XII—XII in FIG. 11. The holding member 125a is fitted to the conveying chain 121a by a support member 131 and a mounting member 132a. A bolt hole 134a receiving a bolt 133a extends through the support member 131. A bolt hole 135a is formed in mounting member 132a so that the bolt 133a may be inserted therethrough when the support member 131 is disposed at the mounting position. The bolt 133a is inserted through bolt holes 134a, 135a, and a nut 136a is engaged thereWith. When the support member 131 is fitted to the mounting member 132a, a head 137a of the bolt 133a is buried in the support member 131. The support member 131 and mounting member 132a are, for example, made of metal. The holding member 125a is attached to the support member 131. The holding member 135a includes a spacer 138 affixed to the support member 131 and a pressure-fit member 139 affixed to the spacer 138. The spacer 138 is made of rubber or soft synthetic resin material and is elastic. The pressure-fit member 139 is made of a softer material than the spacer 138 and is both elastic and flexible. When such pressure-fit member 139 is fitted to the support member 13 through the spacer 138, a space 140 therebetween is formed. Meanwhile, the lower surface of the pressure-fit member 139 forms a holding surface 130a.

The holding member 125b is, for example, made of metal and is fitted to the conveying chain 121b by a mounting member 132b. A bolt hole 134b for receiving a bolt 133b is formed in the holding member 125b. In the mounting member 132b is formed a bolt hole 135b for receiving the bolt 133b. The bolt 133b is inserted into bolt holes 134b, 135b and is fastened with a nut 136b, so that the holding member 125b is fixed to the mounting member 132b. The head 137b of bolt 133b is buried in the holding member 125b, thereby forming a groove 141 extending in the vertical direction in FIG. 12 and opening onto a holding surface 130b. A member 142 is rigidly fitted into the groove 141. As a result, the holding surface 130b is formed in a concave shape on the whole. Member 142 is made of the same soft material as the pressure-fit member 139 and operates to prevent lateral slip page of a main body. Moreover, by placing member 142 in the groove 141, flesh pushed out by apparatus 120 is prevented from entering groove 141, and growth of bacteria that would be formed by such residue is effectively prevented, and thus the apparatus may be kept clean. Also, cleaning is easy, and labor for servicing may be saved.

However, fitting of the holding members 125a, 125b to the conveying chains 121a, 121b may be achieved by structure other than the structure shown in FIG. 12.

Figure 13:
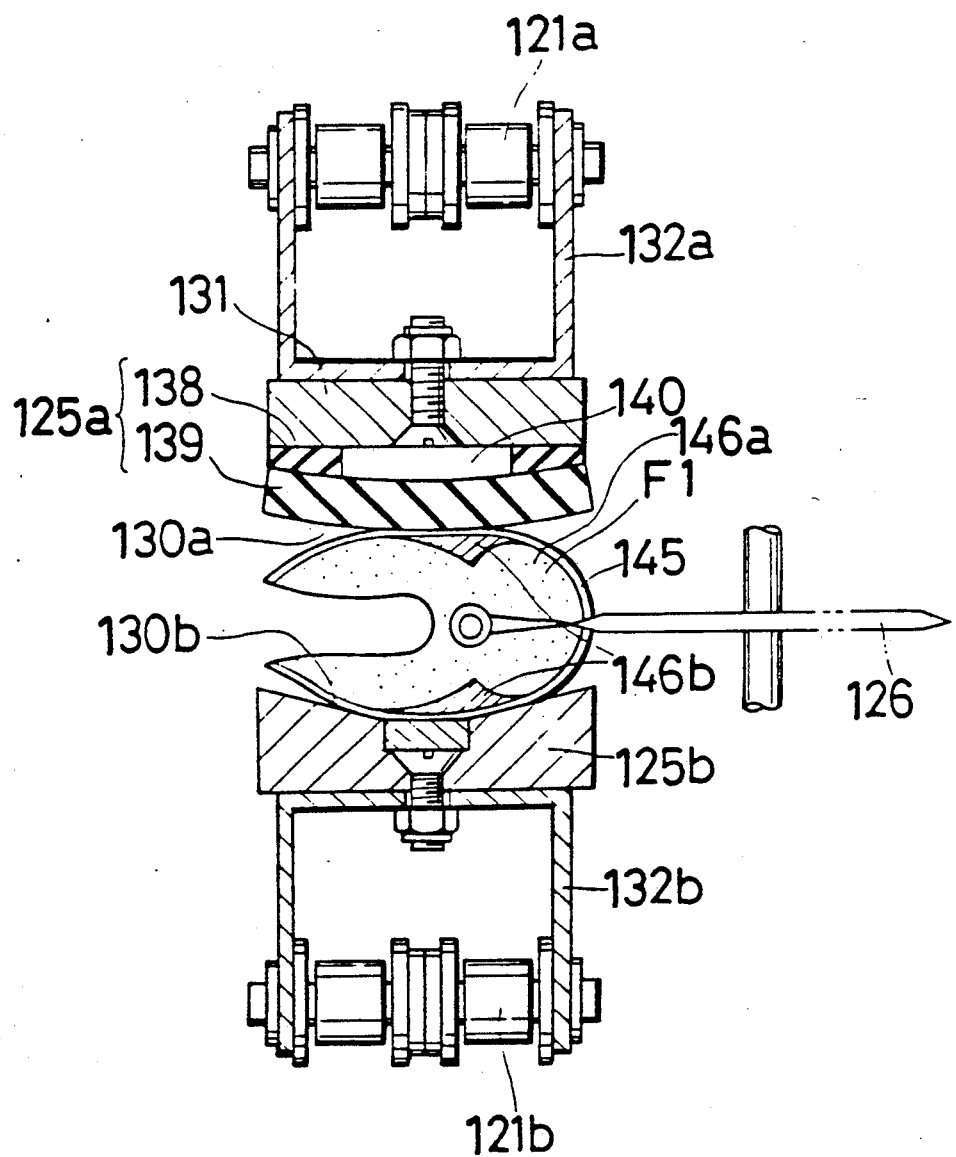
Figure 14:
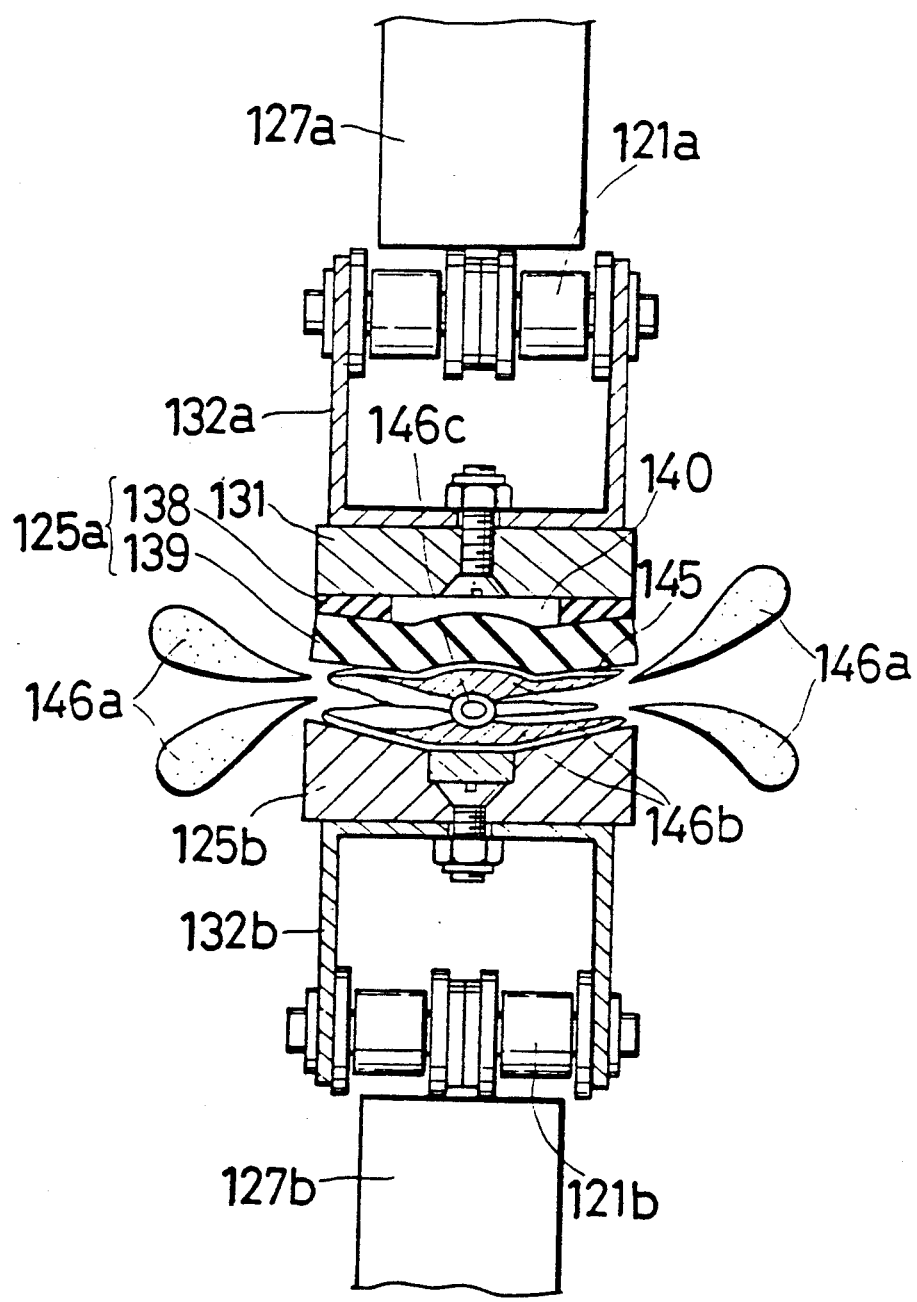

The operation of dark-colored flesh removing device 120 is explained below. The fish body F1 is decapitated, cut along the belly and rid of the viscera, and these operations are achieved by other processing devices. The fish body F1 is delivered into the device 120 in a predetermined alignment with the dorsal-pectoral plane nearly horizontal. The delivered fish body F1 is held by the holding surfaces 130a, 130b, as shown in FIG. 13, and the dorsal skin 135 is cut by the rotary circular knife 126. The fish body F1 thus cut is further conveyed in the conveying direction A, and, as shown in FIG. 14, the pressing members 127a, 127b thrust the conveying chains 121a, 121b in directions toward each other, such that the fish body F1 is compressed by the holding surfaces 130a, 130b. AT this time, as explained in relation to the prior art, since the ordinary flesh 146a and dark-colored flesh 146b of the fish body F1 are easily separated, the ordinary flesh 146a which occupies the majority of the fish body F is pushed out to the outside from the side of the belly and from the side of the back. Since the back side is preliminarily cut open by the rotary circular knife 126, a relatively small pressing force by the holding surfaces 130a, 130b against the fish body F1 is sufficient to cause the ordinary flesh 146a to be removed easily. Besides, since the holding member 125a is elastic and flexible, the pressure-fit member 139 is dislocated toward the space 140, so that the dark-colored flesh 146b sticking to the skin near the backbone will not be crushed completely, thereby preventing the dark-colored flesh 146b from being pushed out together with the ordinary flesh 146a. Thus, the ordinary flesh 146a and dark-colored flesh 146b can be separated more effectively, and only the ordinary flesh 146a will be removed.

Figure 15:
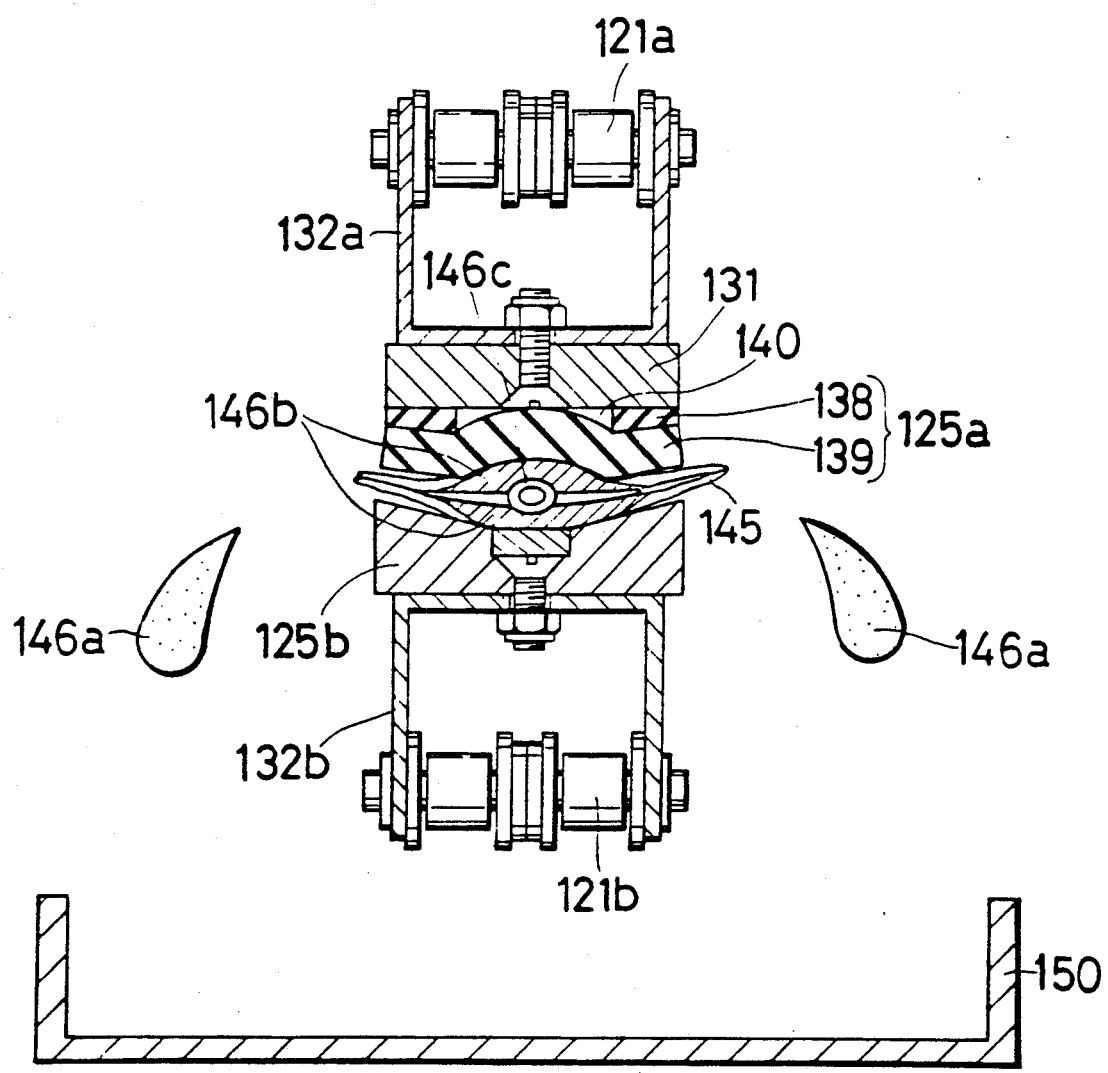
Figure 16:
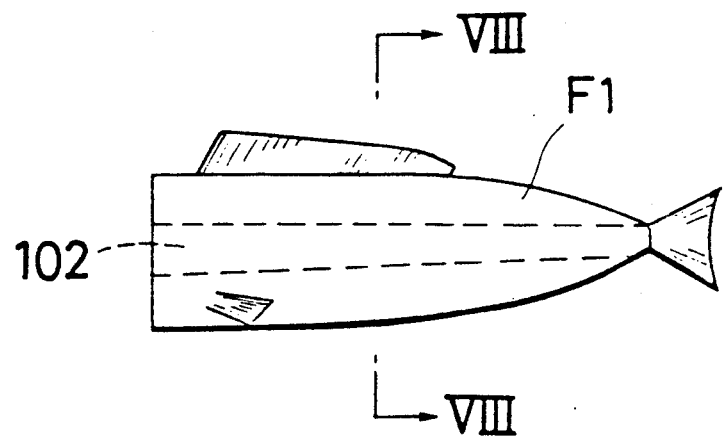
FIG. 16 is a side view of a fish body.
Figure 17:
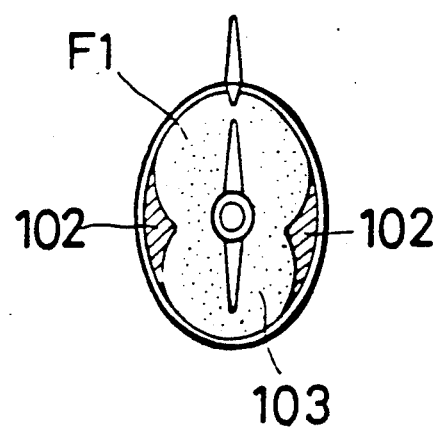
FIG. 17 is a sectional view of the fish body taken along line XVII—XVII in FIG. 16.
Figure 18:
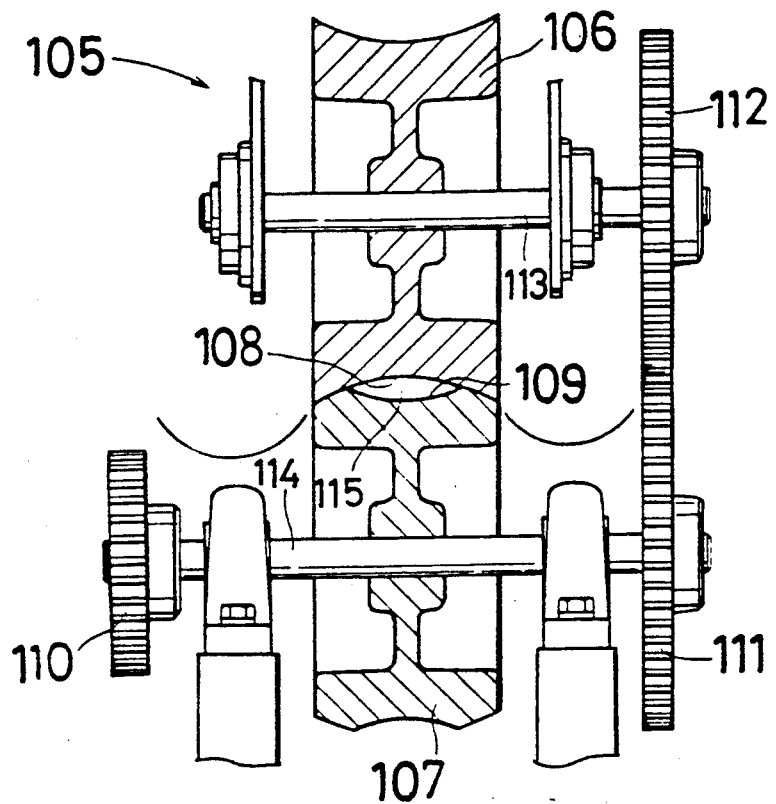
FIG. 18 is a sectional view of a conventional dark-colored flesh removing device.
Figure 19:
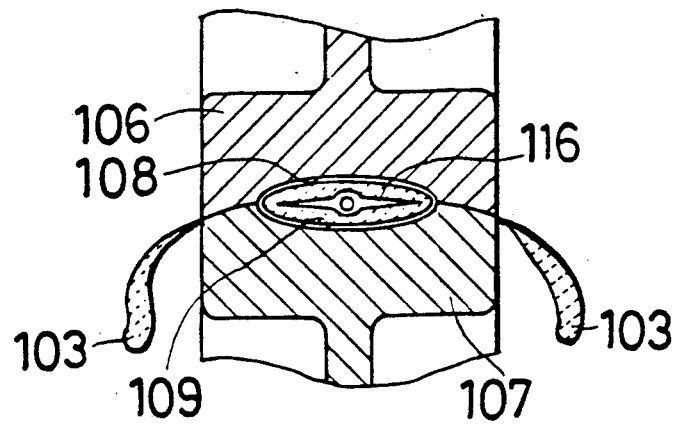
FIG. 19 is a sectional view of essential parts of the dark-colored flesh removing device in a state of holding a fish body.

The ordinary flesh 146a thus pushed out from the holding members 125a, 125b drops off from the holding members 125a, 125b as shown in FIG. 15, and is collected in the tray 150 installed beneath the conveying chain 121b. The skin 145, dark-colored flesh 146b, and backbone 146c remaining on the holding members 125a, 125b are discharged into a tray 151 (see FIG. 10) at the terminal end position in the conveying direction where the holding surfaces 130a, 130a re separated from each other. In this way, the dark-colored flesh 146b, backbone 146c, and skin 145 of the fish body F1 remain and only the Ordinary flesh 146a is removed therefrom.

In other embodiment of the invention, scrapers and/or brushes may be installed at both sides of the conveying route in order to scraper off the ordinary flesh 146a. Besides, when the surface 130a of the pressure-fit member 139 and the surface of the member 142 in the groove 141 of the holding member 125b are roughened, lateral slippage of the fish body may be more surely prevented by the resultant frictional force therebetween.

A different embodiment of the invention is not limited to the structure of the foregoing embodiment in which the fish body is held in the vertical direction by the holding members 125a, 125b. Rather it is possible to hold the fish body in the horizontal direction, and such structure is also included in the technical concept of the invention.

In a further different embodiment of the invention, the space 140 may be filled with a filler having a flexibility made of at least softer material than the spacer 138, such as sponge and soft rubber. As a result, forcing out remaining of the flesh may be prevented, growth of bacteria is inhibited, cleanliness is improved, and the labor for cleaning the apparatus may be saved.

The foregoing embodiment employed the conveying chains 121a, 121b and the holding members 125a, 125b affixed thereto. When the fish body is held by conveying belts instead of the above structure, if the fish body is relatively large, a large frictional force acts between the fish body and the holding surfaces of the conveying belts. This causes the conveying belt to elongated unevenly, which may result in intermittent conveyance of the fish body or jerky movement thereof. In the present invention, however, since the holding members 125a, 125b made of synthetic resin and conveying chains 121a, 121b are used, the fish body can be smoothly conveyed while removing the ordinary flesh without causing such jerky motion.

Furthermore, in the foregoing embodiments the conveying chains 121a, 121b, the holding members 125a, 125b disposed parallel to the conveying chains 121a, 121b, and pressing members 127a, 127b for pressing the holding surfaces 130a, 130b of the holding members 125a, 125b are disposed in the vertical direction. However, these members also may be disposed in the lateral direction or obliquely, and such constructions also are included in the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

What is claimed is:

1. A fish body feeder apparatus in a fish processing machine, said apparatus comprising:
   a conveying trough for conveying fish bodies one-by-one in a conveying direction with the heads/tails of the fish bodies uniformly aligned;
   first constant feed means disposed above said conveying trough in a manner to freely move toward and away from said conveying trough, said first constant feed means including a first rotary feed member which is driven to convey fish bodies on said conveying trough from an upstream side thereof to a downstream side thereof;
   a feed trough inclined downwardly in said conveying direction, said feed trough including a concave fish body conveying surface, and said feed trough having formed therein a notch at a downstream end thereof;
   a receiving trough disposed beneath said notch;
   back-belly aligning means having a fish body tilting mechanism disposed on a discharge trough disposed at a downstream end of said receiving trough;
   second constant feed means including a second rotary feed member mounted for discharging fish bodies from said discharge trough one-by-one and intermittently; and
   transportation means including plural trays for holding the fish bodies one-by-one and disposed at equal pitches on a moving body driven in a running direction orthogonal to said conveying direction.

2. An apparatus as claimed in claim 1, wherein said first rotary feed member and said second rotary feed member rotate at identical speeds.

3. An apparatus as claimed in claim 1, further comprising a dark-colored flesh removing device positioned downstream of said transportation means, said device comprising:
   a pair of endless conveying chains disposed above and below in a vertical direction for conveying fish bodies in a longitudinal direction along a conveying route;
   holding members disposed parallel to said chains and including a lower side holding member disposed on the lower side conveying chain along said conveying route and having a concave fish body holding surface, and an upper side holding member disposed on the upper side conveying chain along said conveying route and made of elastic and flexible material, said upper side holding member being mounted on a support member;
   a pressing member for thrusting and pressing confronting holding surfaces of said upper side and lower side holding members toward each other; and
   means, disposed on an upstream end, of said conveying route from said pressing member for filleting the dorsal side of each of the fish bodies.

4. An apparatus as claimed in claim 3, wherein a space is defined between said upper holding member and said support member disposed on said upper side conveying chain.

5. An apparatus as claimed in claim 3, wherein a gap between said upper side holding member and said support member disposed on said upper side conveying chain is filled with a flexible material.

6. An apparatus as claimed in claim 1, further comprising a dark-colored flesh removing device positioned downstream of said transportation means, said device comprising:
   a pair of endless conveying chains disposed opposite right and left side positions for conveying fish bodies in a longitudinal direction along a conveying route;
   holding members disposed parallel to said chains and including a holding member disposed on one side and disposed on said conveying chain at said one side along said conveying route and having a concave fish body holding surface, and a holding member disposed on other side and disposed on said conveying chain at said other side along said conveying route and made of elastic and flexible material, said other side holding being mounted on a support member;

a pressing member for thrusting and pressing confronting holding surfaces of said one side and other side holding members toward each other; and means, disposed on an upstream end of said conveying route from said pressing member for filleting the dorsal side of each of the fish bodies.

* * * * *